United States Patent [19]

Robertson

[11] 3,980,325
[45] Sept. 14, 1976

[54] FITTING FOR FLEXIBLE PLASTIC PIPE

[75] Inventor: Duane D. Robertson, Denver, Colo.

[73] Assignees: Duane D. Robertson; Frank J. Progar, both of Denver, Colo.

[22] Filed: July 29, 1974

[21] Appl. No.: 492,776

Related U.S. Application Data

[63] Continuation-in-part of Ser. No. 350,306, April 12, 1973, abandoned.

[52] U.S. Cl. .............................. 285/249; 285/328; 285/382.7
[51] Int. Cl.² .......................................... F16L 33/00
[58] Field of Search ........... 285/249, 322, 323, 328, 285/331, 255, 259, 382.7, 423, 341

[56] References Cited
UNITED STATES PATENTS

| | | | |
|---|---|---|---|
| 554,666 | 2/1896 | Feltner | 285/259 X |
| 2,467,520 | 4/1949 | Brubaker | 285/259 X |
| 3,606,396 | 9/1971 | Prosdocimo et al. | 285/249 X |
| 3,888,522 | 6/1975 | Moreiras | 285/341 |

FOREIGN PATENTS OR APPLICATIONS 605,078  7/1948  United Kingdom .................. 285/322

Primary Examiner—Werner H. Schroeder
Assistant Examiner—Moshe I. Cohen
Attorney, Agent, or Firm—Ralph F. Crandell

[57] ABSTRACT

A fitting, for pipe of flexible plastic material, having improved sealing and mechanical holding characteristics. The fitting includes a main body having an external screw thread terminating at a shoulder from which a coaxial, reduced-diameter, nipple projects. Annular saw tooth or buttress ribs on the nipple are dimensioned to have a slip fit into the interior of a plastic pipe section. A collet is slideable on the exterior of the pipe section into abutment with the shoulder and is radially compressed by a collet sleeve threaded onto the external threads of the fitting body. Axial slots in the collet open alternately at opposite ends of the collet so that radial compression is achieved over the entire length of the collet. Saw toothed or buttress annual ribs on the collet interior bite into the exterior surface of the pipe section in opposition to the ribs on the inserted nipple, the pipe wall being thereby radially clamped between the collet and nipple. To prevent relative rotation between the fitting and the pipe during connection and provide a positive nonrotating engagement between the collet and the fitting, the leading end of the collet is provided with a plurality of ratchet teeth which engage and cooperate with projections or ratchet dogs on the face of the shoulder of the fitting and the projections or dogs on the shoulder additionally partially bite into and become embedded in the end of the pipe.

5 Claims, 13 Drawing Figures

FITTING FOR FLEXIBLE PLASTIC PIPE

CROSS-REFERENCE TO RELATED APPLICATION

This is a continuation-in-part application of co-pending application Ser. No. 350,306, filed Apr. 12, 1973 now abandoned.

BACKGROUND OF THE INVENTION

The present invention is directed to a fitting for use with pipe or conduit of flexible plastic material, of the type commonly employed in underground lawn sprinkling systems and analogous environments.

The basic objective of the invention is to provide a fitting which has improved sealing and mechanical holding characteristics, while eliminating relative movement between parts being connected during the connecting process. Most prior art devices in this field are designed with the primary attention being directed to the mechanical holding characteristics of the fitting, with the result that sealing problems frequently arise. Also, when a fitting is being connected to a pipe by a rotatable connector, the pipe will sometimes rotate causing a previously connected joint to be loosened. It is also an object of the present invention to provide a fitting of the type in which the parts are assembled onto the pipe with slip fits, and in which the improved sealing and mechanical holding properties referred to above are achieved automatically upon assembly with the pipe and hand tightening of a threaded sleeve, so that no tools are required to install the fitting.

SUMMARY OF THE INVENTION

The fitting of the present invention is constructed of three basic elements — a fitting body, a collet, and a collet sleeve — all of which are formed of a molded plastic material. The fitting body is formed with an annular nipple having a series of radially projecting, saw-toothed or buttress annular ribs near its outer end, and dimensioned to be inserted with a slip fit into the end of a pipe section onto which the fitting is to be mounted. The inner end of the nipple terminates at a radially outwardly projecting shoulder against which the pipe end may be seated, and a coaxial external thread extends inwardly along the body from the shoulder. A collet is slidable upon the exterior of the pipe section into axial abutment with the shoulder, the collet having a frusto-conical cam surface at its outer end and a plurality of axially extending slots opening alternately at opposite axial ends of the collet. The interior of the collet is formed with a series of radially inwardly projecting annular saw-toothed or buttress ribs which are located axially in opposition to the ribs on the nipple when the collet is seated against the shoulder.

A collet sleeve, threadable onto the external threads of the body, has a tapered bore complementary to the cam surface of the collet to radially compress the collet when the sleeve is threaded onto the fitting body, the pipe wall being radially clamped between the nipple and collet. The toothed ribs on the collet and nipple bite into the juxtaposed pipe surfaces to provide mechanical retention and some sealing characteristics, while opposed smooth cylindrical sections at the inner ends of the nipple and collet provide increased surface contact with the pipe walls to insure adequate sealing. By slotting the collet alternately from opposite ends, radial compression of the collet over its entire axial length is achieved. Preferably, the outermost rib on the nipple is of a slightly larger diameter than the remainder of the ribs to facilitate inserting of the fitting into the open end of the pipe.

The leading end of the collet may be provided with a plurality of integral, circumferentially spaced ratchet teeth coextensive with the end surface, and adapted to mate with spaced projections or ratchet dogs projecting axially from the shoulder of the fitting body. The ratchet projections or dogs on the shoulder are also sharply pointed and positioned to engage and partially bite into the leading end of the pipe so that the pipe is prevented from relative rotational movement with respect to the nipple when the sleeve is threaded onto the fitting body.

Other objects and features of the invention will become apparent by reference to the following specification and the drawings.

IN THE DRAWINGS

Figure 1:
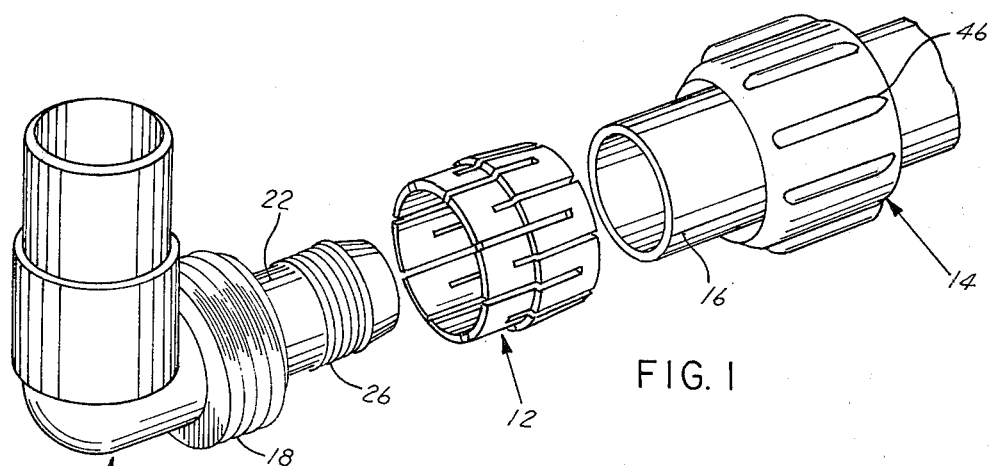
FIG. 1 is an exploded perspective view of a fitting embodying the present invention.
Figure 2:
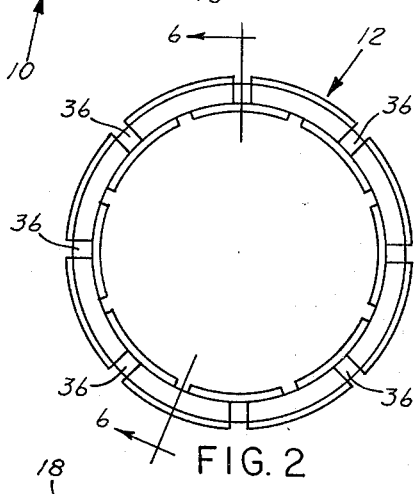
FIG. 2 is an inner end view of the collet.
Figure 3:
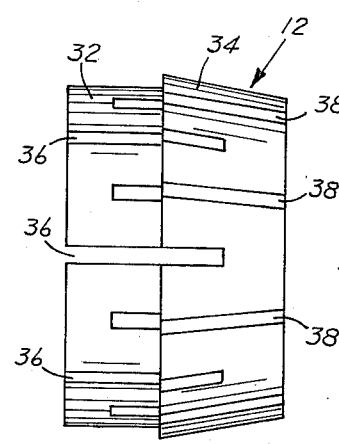
FIG. 3 is a side elevational view of the collet of FIG. 1.
Figure 4:
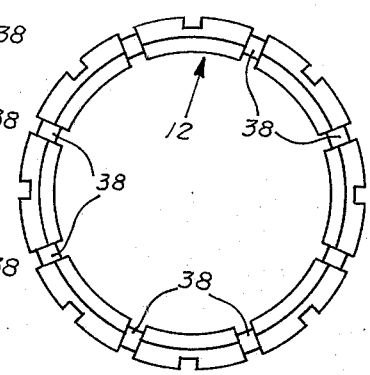
FIG. 4 is an outer end view of the collet.

One embodiment of a fitting embodying the present invention as shown in FIGS. 1 through 7 includes a main body designated generally 10, a collet 12, and a collet sleeve 14, all of these parts being dimensioned in accordance with the dimensions of a particular standard size of flexible plastic pipe 16 with which the fitting is to be employed. In the embodiment shown in FIGS. 1 through 7, the configuration of body 10 is that of an elbow fitting employed to connect plastic pipe section 16 to a metal riser (not shown), however, as will be apparent from the following description, the present invention is equally applicable to other forms of fittings.

Figure 5:
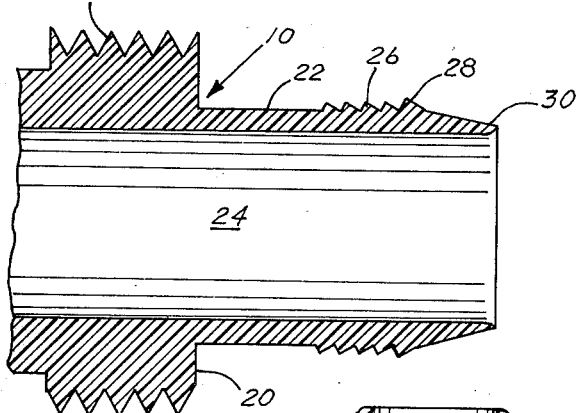
FIG. 5 is a detail cross-sectional view of the nipple and external thread section of the fitting body.
Figure 6:
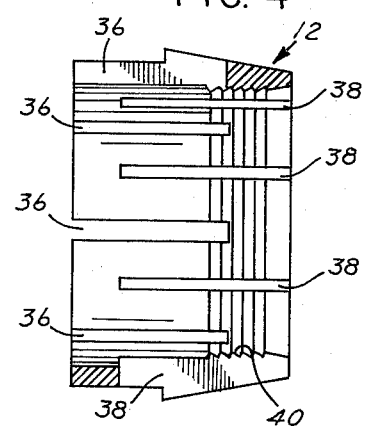
FIG. 6 is a cross-sectional view of the collet taken on line 6—6 of FIG. 2.

Referring to FIG. 5, it is seen that body 10 is formed with an external screw thread 18 terminating at its outer end in a radial shoulder 20 from which coaxially projects an inwardly formed reduced diameter nipple 22. A central flow passage 24 extends coaxially through the nipple and body. Near the outer end of nipple 22, a series of circumferentially extending annular ribs of saw tooth or buttress shaped cross-section project radially from the nipple, the axially outermost rib 28 being of slightly greater diameter than the remainder of ribs 26. The outermost end portion of nipple 22 is tapered as at 30 to facilitate the insertion of the nipple into the interior of pipe 16, the nipple being dimensioned to have a slip fit into the pipe interior.

Turning now to FIGS. 2, 3, 4 and 6, it is seen that collet 12 is formed with a hollow cylindrical inner end section 32 and an integrally joined frusto-conical outer end section 34 which tapers to a minimum diameter approximately equal to that of cylindrical inner end section 32 at its outer end, the taper being approximately 9°. A first series of slots 36 extend axially of collet 12 from its inner end to a location approximately midway axially of outer end section 34, the slots 36 being uniformly and circumferentially spaced from each other. A second series of slots 38 extend axially from the outer end of collet 12 to a location approximately midway axially of inner end section 32, the slots 38 likewise being uniformly spaced circumferentially and located intermediate adjacent slots 36 so that the slots 36, 38 of the collet extend alternately from opposite ends of the collet. A series of radially inwardly projecting saw tooth or buttress ribs 40 are formed on the interior of the collet, the ribs 40 being axially coextensive with the series of ribs 26 on nipple 22 when the inner end of collet 12 is seated against shoulder 20 of body 10.

Figure 7:
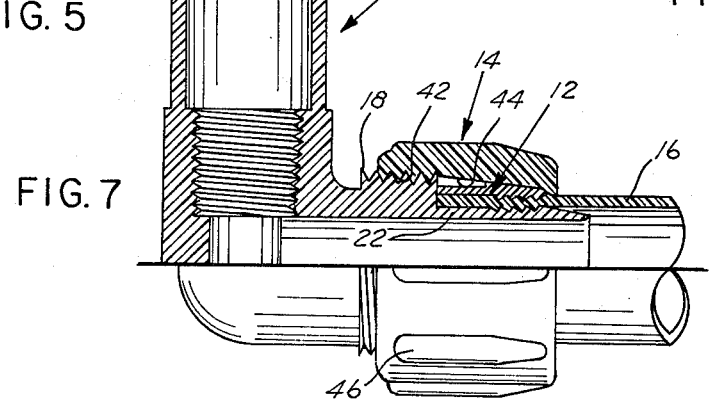
FIG. 7 is a quarter section view of the fitting in its fully assembled condition.

Collet sleeve 14 is formed, as best seen in FIG. 7 with an internal screw thread at its inner end which is threadably engageable with external threads 18 of body 10. An outwardly convergent tapered bore 44 extends coaxially from the inner ends of threads 42, bore 44 having a taper complementary to that of the frusto-conical outer end or cam section 34 of collet 12. Outwardly projecting axial ribs 46 are formed on the exterior of sleeve 12 to assist in hand tightening the sleeve.

The fitting in its fully assembled condition is shown in FIG. 7. The fitting is assembled by first slipping collet sleeve 14 and then collet 12 onto the end of the pipe section 16 to which the fitting is to be applied. Nipple 22 is then inserted into the end of pipe section 16 until the pipe section end is seated against shoulder 20. Collet 12 is then slipped axially along the exterior of the pipe until its inner end section 32 abuts shoulder 20. Collet sleeve 14 is then threaded onto external threads 18 of body 10, the axial movement of sleeve 14 pulling the surface of tapered bore 44 into engagement with the frusto-conical outer end section 34 of the collet to thus radially compress the collet as sleeve 14 is tightened onto threads 18. Radial compression of the collet squeezes the pipe wall inwardly against the outer surface of nipple 22, the saw toothed ribs 26 and 40 of the nipple and collet biting into the pipe wall as the radial compression of collet 12 increases. Because of the alternating openings of slots 36 and 38 of the collet, the collet is radially compressed over its entire axial length and the smooth or unribbed portions of collet and nipple 22 are thus urged firmly into engagement with the opposed surfaces of the wall of pipe 16 to further improve the sealing action of the fitting. The enlarged diameter of outer rib 28 on nipple 22 assists in both making the nipple easier to insert into pipe section 16 and also providing the maximum bite into the pipe at the outer end of the portion ribbed by ribs 26 to increase the mechanical holding properties of the coupling.

The collet 12 is formed with a total of 16 slots, the series of slots 36 and 38 each including eight slots. This arrangement has been found preferable for a collet to be used with standard 1 inch outside diameter (1 inch O.D.) plastic pipe. Circumferential uniformity of the seal thereby achieved increases with the number of slots employed in the collet, however, the number of slots has a practical maximum limit from the standpoint of mechanical integrity. Where 16 slots are employed in a collet having a nominal internal diameter of one inch, a slot width of 0.064 inches is preferred, with the axial slot length being chosen such that slots 36 terminate approximately midway axially of the outer end section and slots 38 terminate approximately midway axially of the inner end section.

Another embodiment of a fitting embodying the present invention is shown in FIGS. 8 through 13 to include a main body designated generally 50, a collet 52, and a collet sleeve 54, all of these parts being dimensioned in accordance with the dimensions of a particular standard size of flexible plastic pipe with which the fitting is to be employed. In the embodiment shown in FIGS. 8 through 13, the configuration of body 50 is that of a straight connector adapted to interconnect straight sections of coaxial pipe.

Figure 8:
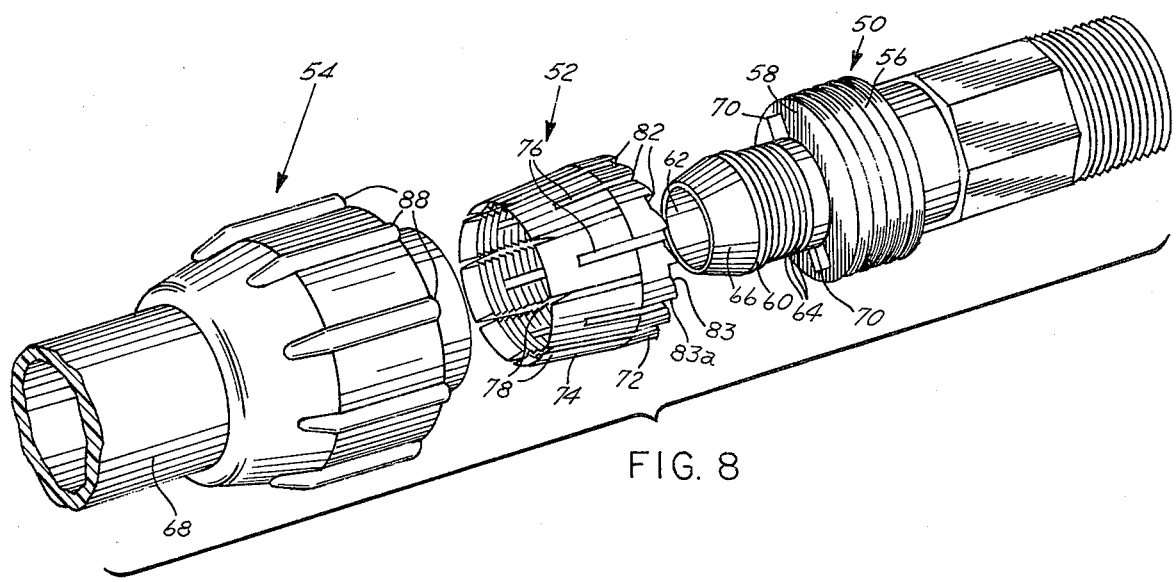
FIG. 8 is an exploded, perspective view of another embodiment of a fitting embodying the present invention.
Figure 9:
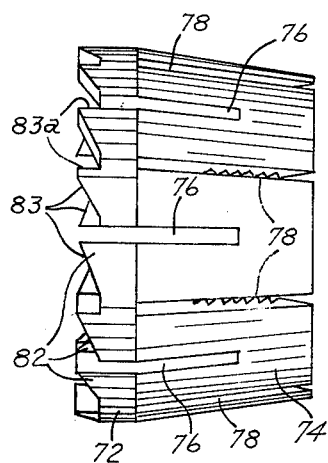
FIG. 9 is a side elevational view of the collet shown in FIG. 8.
Figure 10:
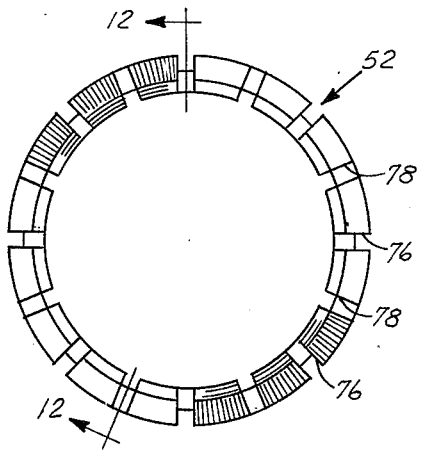
FIG. 10 is the left hand end view of the collet shown in FIG. 9.
Figure 11:
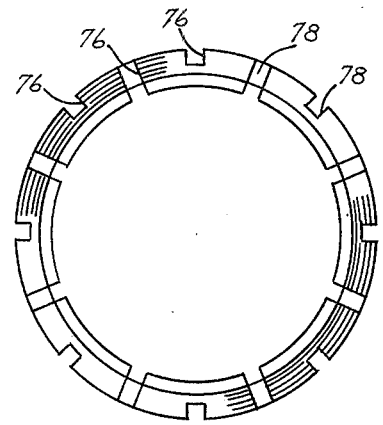
FIG. 11 is the right hand end view of the collet shown in FIG. 9.
Figure 12:
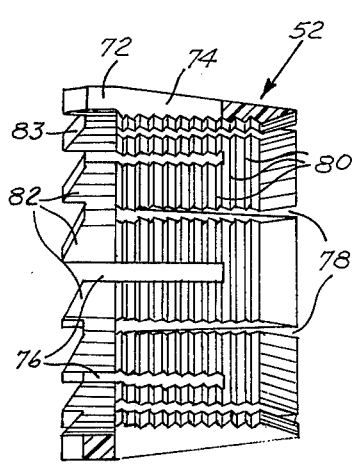
FIG. 12 is a section view taken substantially in the plane of line 12—12 on FIG. 10.

Referring to FIG. 8, it is seen that the body 50 is formed with an external screw thread 56 terminating at one end in a radial shoulder 58 which circumscribes a coaxially projecting reduced diameter nipple 60. A central flow passage 62 extends axially through the nipple and the body. The nipple 60 has a series of circumferentially extending annular ribs 64 of saw tooth or buttress shaped cross-section projecting radially therefrom. The distal end of the nipple is tapered as at 66 to facilitate the insertion of the nipple into the interior of the open end of a pipe 68, the nipple being dimensioned to have a slip fit into the pipe interior.

Projecting axially away from the shoulder 58 are two spaced, integral ratchet dogs or projections in the form of pointed teeth 70 defined by a sloping surface 71 and an abrupt shoulder 71a, which are diametrically spaced from each other on opposite sides of the nipple. As will be explained in more detail hereinafter, these ratchet dogs may be sharp and are adapted to partially bite into and embed in the end of the pipe 68, as well as to cooperate with the collet 52 in preventing relative rotation between the fitting nipple and the pipe. To this end, the dogs are radially thicker than the thicker end of the collet and extend from the nipple outwardly substantially the width of the shoulder.

Turning now to FIGS. 9 through 12, it is seen that the collet 52 is formed with a hollow cylindrical leading end section 72 and an integrally joined frusto-conical trailing end section 74 which has an outer surface that tapers convergingly toward the trailing end of the collet. The inner surface of the collet, however, is substantially cylindrical to slidably fit on the outer surface of the pipe 68. A first series of slots 76 extend axially of the collet from its leading end along approximately 3/4 of the length of the collet, the slots 76 being uniformly and circumferentially spaced from each other. A second series of slots 78 extend axially from the trailing end of the collet along approximately 3/4 of the length of the collet, the slots 78 likewise being uniformally and circumferentially spaced and being located intermediate the adjacent slots 76 so that the slots 76 and 78 of the collet extend alternately from opposite ends of the collet. A series of radially inwardly projecting sawtoothed or buttress ribs 80 are formed on the interior of the collet with the ribs being axially coextensive with the series of ribs 64 on the nipple when the leading end of the collet is seated against the shoulder 58 of the body 50.

In order to prevent relative rotation between the collet 52 and the nipple body 50, the leading, thicker end of the collet is provided with a plurality of ratchet teeth 82 which are adapted to engage and mesh with the ratchet dogs 70 on the shoulder 58 to prevent clockwise rotation of the collet relative to the body when the collet sleeve 54 is tightened onto the body by clockwise rotation. The ratchet teeth 82 are defined by a sloping surface 83 and an abrupt shoulder 83a, and are coextensive with the surface of the collet end. The teeth 82 are further approximately 1/2 the width of the ratchet dogs 70 on the shoulder 58 so that the ratchet dogs 70 can bite into the leading end of the pipe section 68 while mating with the teeth 82. The abrupt surface or shoulder 83a on the collet faces in the direction of tightening, while the abrupt surface on shoulder 71a on the fitting faces in the opposite direction.

Figure 13:
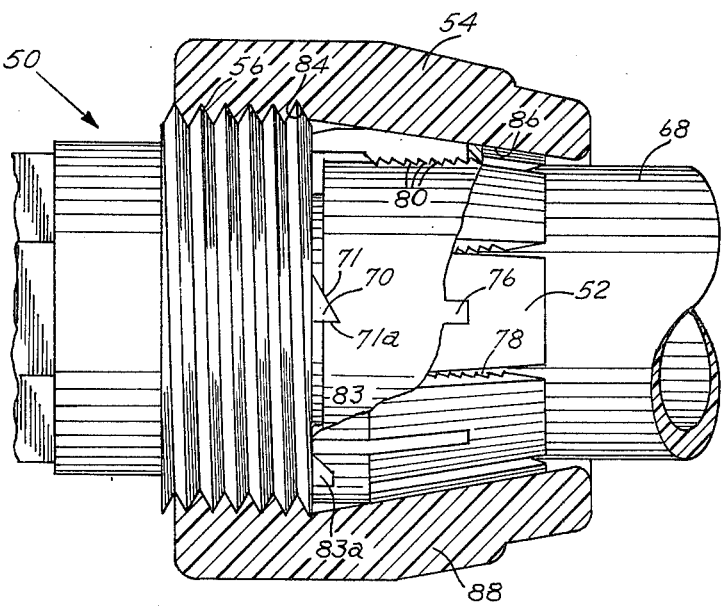
FIG. 13 is an assembly view of the collet and conduit shown in FIG. 8 with parts cut away for clarity in illustration.

The collet sleeve 54 is formed, as best seen in FIGS. 8 and 13 with an internal screw thread 84 at one end which is threadedly engageable with the external threads 56 of the body. A rearwardly convergent tapered bore 86 extends coaxially from the trailing end of the threads, bore 86 having a taper complementary to that of the frusto-conical section 74 of the collet. Outwardly projecting axially extending rounded ribs 88 are formed on the exterior surface of the collet sleeve to assist in hand tightening the sleeve onto the body.

The fitting in its fully assembled condition is shown in FIG. 13. The fitting is assembled by first slipping the collet sleeve 54 and then the collet 52 onto the end of the pipe section to which the fitting is to be applied. The nipple 60 is inserted into the end of pipe section 68 until the pipe section end is seated against the shoulder 58. The ratchet dogs 70 on the shoulder should be firmly set against the cut end of the pipe section. The collet 52 is then slipped axially along the exterior of the pipe or conduit until its leading end abuts the shoulder so that the ratchet teeth 82 on the leading end of the collet engage and mesh with the ratchet dogs 70 on the shoulder. Collet sleeve 54 is then threaded onto the external threads 56 of the body, the axial movement of the collet sleeve pulling the tapered bore into engagement with the frusto-conical outer surface of the collet to thus radially compress the collet 52 as the sleeve 54 is tightened onto the thread 56. Radial compression of the collet 52 squeezes the flexible pipe wall inwardly against the outer surface of the nipple 60, so that the toothed ribs of the nipple and collet bite into the pipe wall as the radial compression of the collet increases. Because of the alternating openings of the slots 76 and 78 of the collet, the collet is radially compressed over its entire axial length, and the smooth or unribbed portions of the collet and nipple are thus urged firmly into engagement with the opposed surfaces of the pipe to further improve the sealing action of the fitting. As the collet sleeve is tightened onto the body, the ratchet dogs 70 on the shoulder of the body become more and more firmly embedded in the end of the plastic pipe to prevent the body from turning relative to the pipe. At the same time, the ratchet dogs 70 on the shoulder engage with adjacent ratchet teeth 82 on the leading end of the collet so that the collet is prevented from rotating relative to the body. In this manner, the collet, the body and the pipe section are prevented from rotating relative to each other as the collet sleeve is tightened onto the body to complete the sealed connection of the component parts. The relative rotational immobilization of the parts is important with the plastic pipe fittings since is has been found that, in some instances, it is difficult to tighten the fittings without rotating the pipe section, which results in the loosening of previously connected fittings, or, in other words, the tightening of one fitting automatically loosens a previously connected fitting.

It will be observed that the plurality of ratchet teeth 82 coextensive with the thicker end of the collet sleeve insure a positive engagement between the collet and fitting shoulder substantially immediately upon assembly and with a minimum of rotation of the collet with respect to the fitting. Because of the interengagement of the sloping surfaces on the mating ratchet teeth and dogs, the collet is positioned automatically, upon inserting a conduit between the collet and the fitting nipple and the initial turn of the sleeve 54, while the collet 52 is still loose on the conduit, to effect positive engagement between the respective ratchet teeth. It is thus unnecessary to "hunt" for a locking position or to allow the collet to rotate even a few degrees during tightening of the fitting.

While certain illustrative embodiments of the invention have been shown in the drawings and described in considerable detail, it should be understood that there is no intention to limit the invention to the specific forms disclosed. On the contrary, the intention is to cover all modifications, alternative constructions, equivalents and uses falling within the spirit and scope of the invention as expressed in the appended claims.

What is claimed is:

1. In a pipe fitting, for engagement with a cut end of pipe of flexible plastic material, which fitting includes a hollow tubular body having an external screw thread on an intermediate portion thereof terminating at a radially inwardly extending shoulder and a nipple of reduced diameter at one end portion thereof projecting coaxially outwardly from said shoulder, said nipple being inserted into a cut end of a flexible pipe with the cut end positioned in closely adjacent relationship with said shoulder, an annular slotted frusto-conical collet having a thicker end and a tapered end positioned over said pipe and inserted nipple with the thicker end of said collet in close juxtaposition to said shoulder, and a collet clamping sleeve having an internal screw thread at one end portion cooperating with the external thread on said body and a coaxial inwardly tapering frusto-conical surface at its other end complementary to said frusto-conical collet and engaged with said collet and radially compressing the same against the pipe with said collet in abutment with said shoulder and said sleeve threaded axially inwardly onto said body; the improvement comprising: a plurality of spaced, axially projecting ratchet dogs integral with said body shoulder and engaging and biting into the cut end of the pipe with said nipple inserted thereinto, and a plurality of axially extending ratchet teeth integral and coextensive with the thicker end of the collet and positioned in juxtaposition with said shoulder in holding engagement with said dogs when said collet sleeve is threaded onto said collet and body, thereby preventing relative rotation between the pipe and the fitting body as said collet sleeve is threadably tightened in place to effect gripping engagement of the pipe between the collet and the nipple.

2. The improvement defined in claim 1 wherein said dogs are sharply pointed for biting engagement with the cut end of a pipe inserted into the fitting.

3. A pipe fitting for engagement with a cut end of a pipe of flexible plastic material, said fitting comprising, in combination a hollow tubular body having a continuous flow passage extending axially therethrough, an external screw thread on an intermediate portion thereof terminating at a radially inwardly extending shoulder and an integral nipple of reduced diameter projecting coaxially outwardly from said shoulder, said nipple having an external diameter affording a snugly sliding fit when inserted within said cut end of the plastic pipe, the cut end of said pipe being advanced over said nipple into juxtaposed relationship with said shoulder, pointed ratchet projections on said shoulder partially embedded in the cut end of said pipe, an annular frusto-conical collet having a plurality of axially extending slots therein opening alternately into opposite ends thereof, each slot extending only partially along said collet with the inner ends of said slots alternately overlapping, said collet having an internal diameter affording a sliding fit over said pipe, one end of said collet axially abutting said shoulder concentrically of said nipple, said one end of the collet having ratchet means thereon cooperatively engaging with the pointed ratchet projections on said shoulder to prevent relative rotation between said collet and the body, said collet defining a radially inwardly tapering exterior cam surface, and a collet sleeve clamping said collet to the pipe, said sleeve having an internal screw thread at one end threadably engaged with said external thread on said body and a coaxial frusto-conical surface at its other end complementary to said cam surface on said collet and engaging said cam surface on said collet and radially compressing said collet against the pipe when said collet is in abutment with said shoulder and said sleeve is threaded axially inwardly onto said body.

4. A fitting as defined in claim 3 wherein the exterior of said nipple and the interior of said collet are formed with a series of annular ribs of buttress shaped cross section.

5. A fitting as defined in claim 4 wherein said ribs on the interior of said collet are substantially coextensively overlapped by said cam surface.

\* \* \* \* \*